US 8,269,899 B2

(12) United States Patent
Watanabe et al.

(10) Patent No.: US 8,269,899 B2
(45) Date of Patent: Sep. 18, 2012

(54) ELECTRONIC DEVICE, METHOD FOR RESPONDING TO MESSAGE, AND PROGRAM

(75) Inventors: Yasuyuki Watanabe, Tokyo (JP); Kunihiro Esaki, Tokyo (JP)

(73) Assignee: Sony Corporation, Tokyo (JP)

( * ) Notice: Subject to any disclaimer, the term of this patent is extended or adjusted under 35 U.S.C. 154(b) by 941 days.

(21) Appl. No.: 12/269,328

(22) Filed: Nov. 12, 2008

(65) Prior Publication Data

US 2009/0190040 A1    Jul. 30, 2009

(30) Foreign Application Priority Data

Jan. 30, 2008    (JP) .................................. 2008-018976

(51) Int. Cl.
*H04N 5/268* (2006.01)
(52) U.S. Cl. ....................................................... 348/706
(58) Field of Classification Search ........................ None
See application file for complete search history.

(56) References Cited

U.S. PATENT DOCUMENTS

2007/0036158 A1 *   2/2007   Hun-Kwon et al. .......... 370/389

FOREIGN PATENT DOCUMENTS

| EP | 1 968 239 A1 | 9/2008 |
|---|---|---|
| JP | 2007-202115 | 8/2007 |
| WO | WO2007/136038 | * 11/2007 |

OTHER PUBLICATIONS

"High-Definition Multimedia Interface Specification Version 1.3a", Nov. 10, 2006, 276 pages.

* cited by examiner

*Primary Examiner* — Jefferey Harold
*Assistant Examiner* — Michael Teitelbaum
(74) *Attorney, Agent, or Firm* — Oblon, Spivak, McClelland, Maier & Neustadt, L.L.P.

(57) ABSTRACT

An electronic device includes a connection terminal to connect to an external device via an interface including a first transmission path capable of unidirectional transmission of digital signals and a second transmission path capable of bidirectional transmission of a predetermined message; a detecting unit to detect whether the unidirectional transmission to the external device is possible/impossible; an obtaining unit to obtain an address of the electronic device from the external device if the unidirectional transmission is possible; a storage unit to store the obtained address; a receiving unit to receive the predetermined message from the external device; a determining unit to determine whether a destination of the received message includes the stored address; a responding unit to respond to the received message if the destination includes the address; and a control unit to control the responding unit not to respond to the received message if the unidirectional transmission is impossible.

5 Claims, 11 Drawing Sheets

| LOGICAL ADDRESS | DEVICE |
|---|---|
| 0 | TV |
| 1 | RECORDING DEVICE 1 |
| 2 | RECORDING DEVICE 2 |
| 3 | TUNER 1 |
| 4 | PLAYBACK DEVICE 1 |
| 5 | AUDIO SYSTEM |
| 6 | TUNER 2 |
| 7 | TUNER 3 |
| 8 | PLAYBACK DEVICE 2 |
| 9 | RECORDING DEVICE 3 |
| 10 | TUNER 4 |
| 11 | PLAYBACK DEVICE 3 |
| 12 | RESERVED |
| 13 | RESERVED |
| 14 | FREE USE |
| 15 | UNREGISTERED (AS INITIATOR ADDRESS) BROADCAST (AS DESTINATION ADDRESS) |

ELECTRONIC DEVICE, METHOD FOR RESPONDING TO MESSAGE, AND PROGRAM

CROSS REFERENCES TO RELATED APPLICATIONS

The present invention contains subject matter related to Japanese Patent Application JP 2008-018976 filed in the Japanese Patent Office on Jan. 30, 2008, the entire contents of which are incorporated herein by reference.

BACKGROUND OF THE INVENTION

1. Field of the Invention

The present invention relates to an electronic device capable of transmitting data via an HDMI (High-Definition Multimedia Interface), a method for responding to a message, and a program.

2. Description of the Related Art

In recent years, the HDMI has been recognized as a standard enabling digital output from an AV (Audio Video) device, such as a DVD (Digital Versatile Disc) player or an STB (Set Top Box), to a display device, such as a digital TV (Television) set. The HDMI standard utilizes TMDS (Transition Minimized Differential Signaling) as a method for unidirectionally transmitting uncompressed digital video signals and digital audio signals and defines CEC (Consumer Electronics Control), which is a protocol for bidirectionally transmitting control signals. The use of the CEC protocol enables relay of control signals between devices, so that a plurality of AV devices can be controlled from a single remote control.

In the CEC protocol, physical addresses of respective devices are mapped first by using a DDC (Display Data Channel) bus. In this case, the respective devices obtain physical addresses by reading EDID (Extended Display Identification Data) from a device connected on the other end (sink device) through the DDC bus when an HPD (Hot Plug Detect) signal is "High", that is, when the above-described unidirectional transmission is permitted to the sink device. Then, logical addresses of the respective devices are mapped by using a CEC bus. In this case, the respective devices transmit a <Polling> message and obtain a logical address in accordance with the response result (see Nonpatent Document 1: "High-Definition Multimedia Interface Specification Version 1.3a" Jun. 22, 2006).

However, Nonpatent Document 1 does not define message transmission using the CEC protocol in the case where connection permission by the HPD as a trigger to enable the above-described unidirectional transmission is canceled about a mapping state of physical and logical addresses.

On the other hand, Patent Document 1 (Japanese Unexamined Patent Application Publication No. 2007-202115 (paragraph [00] and drawings)) describes the following. A communication device holds obtained physical and logical addresses, and responds to a received message on the basis of the physical and logical addresses held therein regardless of whether connection permission by the HPD is effective or ineffective.

SUMMARY OF THE INVENTION

However, in the technique described in Patent Document 1, a problem occurs in the following case.

For example, assume the case where a sink device (root device) includes two HDMI input terminals (first and second input terminals) and where two source devices (first and second source devices) are connected to the sink device. First, the first source device is connected to the first input terminal, and logical and physical addresses are assigned. Then, the first source device is disconnected from the first input terminal. At this time, the first source device holds the logical and physical addresses. Then, the second source device is connected to the first input terminal and the logical and physical addresses that are the same as those assigned to the first source device are assigned. Then, the first source device is connected to the second input terminal. At this time, an HPD signal of the second input terminal is "Low" and a process of re-obtaining physical and logical addresses is not performed. Thus, the physical and logical addresses of the first source device are the same as the above-described held physical and logical addresses, that is, the physical and logical addresses same as those of the second source device. Accordingly, even when the first source device receives a message originally addressed to the second source device from the sink device, the first source device responds to the message. As a result, a process not intended by a user is performed, which confuses the user.

In view of the above-described circumstances, the present invention is directed to providing an electronic device capable of appropriately responding to a message from an external device connected on the other end even when the electronic device is assigned with the same address as that of another electronic device connected to the external device, a method for responding to a message in the electronic device, and a program.

An electronic device according to an embodiment of the present invention includes a connection terminal to make a connection to an external device via an interface including a first transmission path capable of unidirectional transmission of uncompressed digital video signals and digital audio signals and a second transmission path capable of bidirectional transmission of a predetermined message; detecting means for detecting whether the unidirectional transmission to the external device through the first transmission path is possible or impossible; obtaining means for obtaining an address of the electronic device from the external device through the second transmission path if the unidirectional transmission is detected to be possible; storage means for storing the obtained address; receiving means for receiving the predetermined message from the external device through the second transmission path; determining means for determining whether a destination of the received message includes the stored address of the electronic device; responding means for responding to the received message if the destination is determined to include the address of the electronic device; and control means for controlling the responding means not to respond to the received message if the unidirectional transmission is detected to be impossible.

Here, the electronic device is a mobile device, such as a camcorder, a digital still camera, a notebook PC (Personal Computer), or a portable DVD player, or a stationary device.

With this configuration, if it is determined that unidirectional communication is impossible in the interface, the electronic device does not respond to a message even if the message is addressed to the device. In the case where the external device includes a plurality of connection terminals and where the connection of the electronic device is changed from one of the connection terminals of the external device to the other connection terminal and another electronic device is connected to one of the connection terminals instead of the electronic device, the stored address is the same as the address of the other electronic device that has been newly connected. Thus, if the electronic device responds to all messages addressed to the device, the electronic device actually responds to a message addressed to the other electronic device by mistake, so that an operation not intended by a user may be performed. However, according to the above-described configuration, the electronic device responds to a message only when unidirectional communication is possible, and thus it can be prevented that a process not intended by the user is performed.

In the electronic device, the determining means may determine whether the received message is a unicasted message or a broadcasted message, and the control means may control the responding means to respond to the message regardless of possible/impossible of the unidirectional transmission if the message is determined to be the broadcasted message.

Accordingly, a wrong response to a unicasted message addressed to another electronic device can be prevented, and an appropriate response can be made to a broadcasted message.

In the electronic device, the interface may be an HDMI (High-Definition Multimedia Interface), the first transmission path may be a TMDS (Transition Minimized Differential Signaling) line, the second transmission path may be a CEC (Consumer Electronics Control) line, and the detecting means may detect whether the unidirectional transmission is possible or impossible on the basis of a level of an HPD (Hot-Plug Detect) signal.

Accordingly, when HPD is "Low" in a device compatible with the HDMI, a wrong response to a message not addressed to the own device can be prevented by performing control not to respond to the message even if the message is addressed to the own device.

A method for responding to a message according to an embodiment of the present invention is a method for responding to a message by an electronic device capable of connecting to an external device via an interface including a first transmission path capable of unidirectional transmission of uncompressed digital video signals and digital audio signals and a second transmission path capable of bidirectional transmission of a predetermined message. The method includes the steps of detecting whether the unidirectional transmission to the external device through the first transmission path is possible or impossible; obtaining an address of the electronic device from the external device through the second transmission path if the unidirectional transmission is detected to be possible; storing the obtained address; receiving the predetermined message from the external device through the second transmission path; determining whether a destination of the received message includes the stored address of the electronic device; responding to the received message if the destination is determined to include the address of the electronic device; and controlling not to respond to the received message if the unidirectional transmission is detected to be impossible.

A program according to an embodiment of the present invention is a program allowing an electronic device capable of connecting to an external device via an interface including a first transmission path capable of unidirectional transmission of uncompressed digital video signals and digital audio signals and a second transmission path capable of bidirectional transmission of a predetermined message to execute the steps of detecting whether the unidirectional transmission to the external device through the first transmission path is possible or impossible; obtaining an address of the electronic device from the external device through the second transmission path if the unidirectional transmission is detected to be possible; storing the obtained address; receiving the predetermined message from the external device through the second transmission path; determining whether a destination of the received message includes the stored address of the electronic device; responding to the received message if the destination is determined to include the address of the electronic device; and controlling not to respond to the received message if the unidirectional transmission is detected to be impossible.

As described above, according to an embodiment of the present invention, even if an electronic device is assigned with the same address as that of another electronic device connected to an external device connected on the other end, the electronic device can appropriately respond to a message from the external device.

DESCRIPTION OF THE PREFERRED EMBODIMENTS

Hereinafter, an embodiment of the present invention is described with reference to the drawings.

Figure 1:
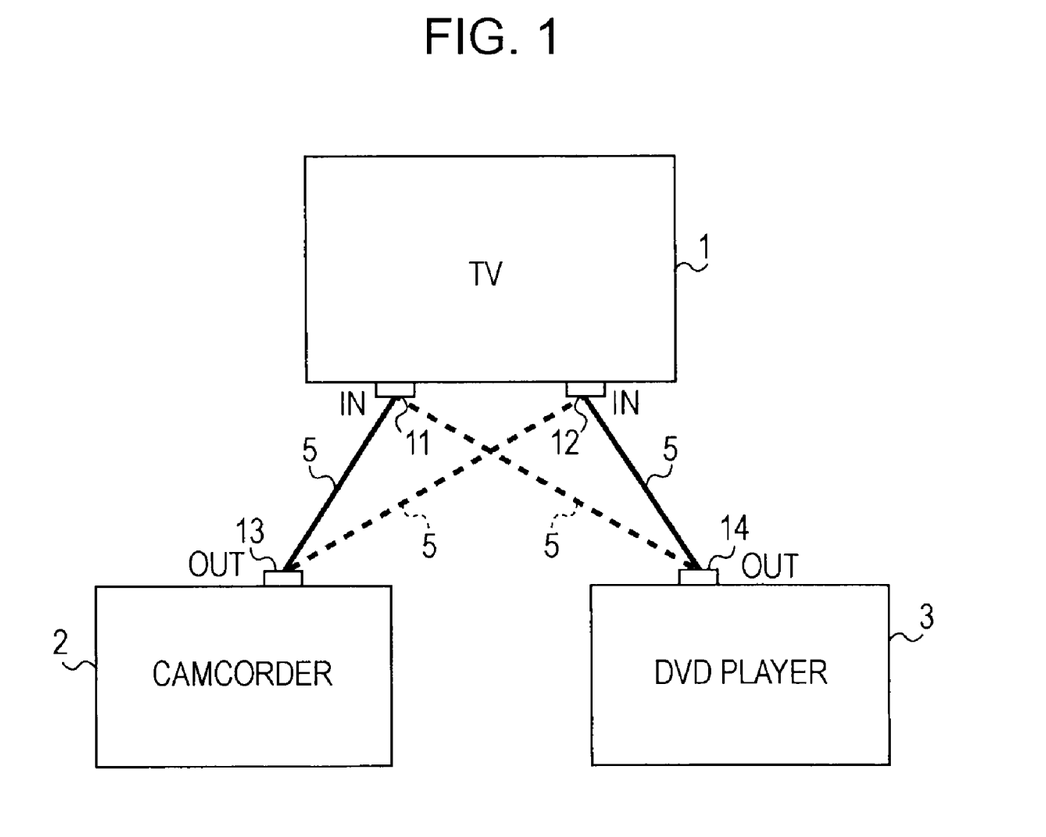
FIG. 1 is a diagram illustrating a configuration of a transmission system according to an embodiment of the present invention.

FIG. 1 is a diagram illustrating a configuration of a transmission system according to an embodiment of the present invention. As illustrated in FIG. 1, the transmission system includes a television device 1 (hereinafter referred to as TV 1), a camcorder 2, and a DVD player 3, which are connected in a tree-like star pattern.

The TV 1 includes two HDMI input terminals 11 and 12. The camcorder 2 includes an HDMI output terminal 13. The DVD payer 3 includes an HDMI output terminal 14. The HDMI input terminals 11 and 12 are connected to the HDMI output terminals 13 and 14 through HDMI cables 5, respectively, whereby the TV 1 can communicate with the camcorder 2 and the DVD player 3. In this case, the TV 1 functions as a sink device, whereas the camcorder 2 and the DVD player 3 function as source devices. The camcorder 2 and the DVD player 3 are capable of transmitting uncompressed digital video data and digital audio data to the TV 1 through the HDMI cables 5 so as to display the data on a display of the TV 1.

Figure 2:
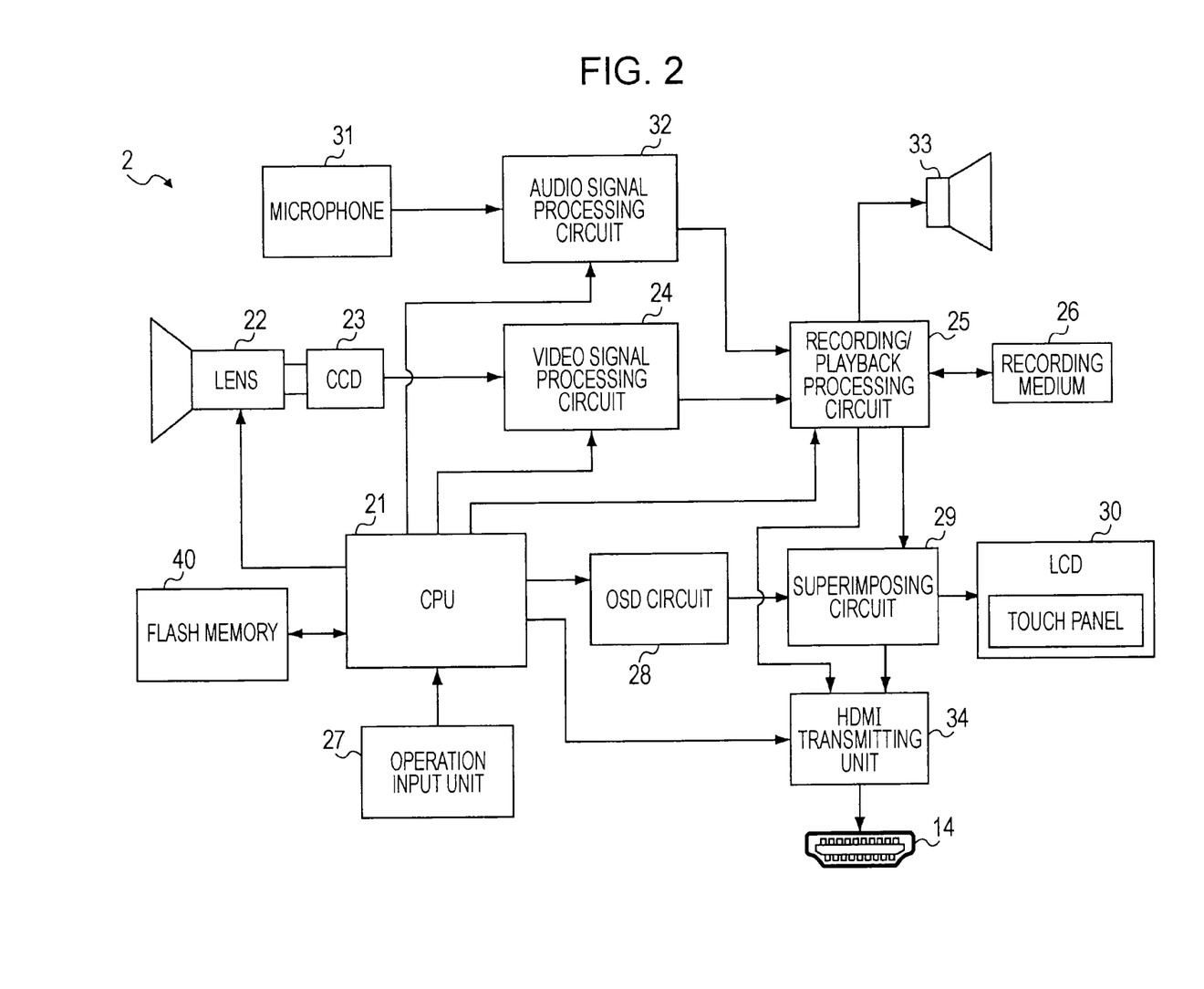
FIG. 2 is a block diagram illustrating a configuration of a camcorder according to an embodiment of the present invention.

FIG. 2 is a block diagram illustrating a configuration of the camcorder 2 according to this embodiment. As illustrated in FIG. 2, the camcorder 2 includes a CPU (Central Processing Unit) 21, a lens 22, a CCD (Charge Coupled Device) 23, a video signal processing circuit 24, a recording/playback processing circuit 25, an operation input unit 27, an OSD (On-Screen Display) circuit 28, a superimposing circuit 29, an LCD (Liquid Crystal Display) 30, a microphone 30, an audio signal processing circuit 32, a speaker 33, a flash memory 40, an HDMI transmitting unit 34, and the above-described HDMI output terminal 13. In addition, a recording medium 26 can be loaded into the camcorder 2.

The CPU 21 performs overall control on the respective parts of the camcorder 2, such as the lens 22, the video signal processing circuit 24, the audio signal processing circuit 32, the recording/playback processing circuit 25, and the OSD circuit 28.

The lens 22 is driven by the CPU 21 and focuses light of a subject image onto a light receiving unit of the CCD 23.

The CCD 23 is constituted by a CCD sensor and performs photoelectric conversion on the light focused by the lens 22 so as to convert the light to analog electric signals. The CCD 23 supplies the analog video signals generated through the conversion to the video signal processing circuit 24. Alternatively, the CCD 23 may be replaced by another imaging device, such as a CMOS (Complementary Metal Oxide Semiconductor) sensor.

The video signal processing circuit 24 is constituted by a DSP (Digital Signal Processor) or the like. The video signal processing circuit 24 converts the analog video signals supplied from the CCD 23 to digital video data under control by the CPU 21. The video signal processing circuit 24 performs predetermined processes on the digital video data and supplies the digital video data to the recording/playback processing circuit 25. The predetermined processes include a process of correcting degradation resulting from the lens 22 or the CCD 23, a process of correcting a white balance or gamma of the video data, and a process of converting resolution, for example.

The microphone 31 collects sounds, converts the sounds to analog audio signals as electric signals, and outputs the audio signals to the audio signal processing circuit 32.

The audio signal processing circuit 32 converts the analog audio signals supplied from the microphone 31 to digital audio data under control by the CPU 21, performs a necessary audio process thereon, and outputs the digital audio data to the recording/playback processing circuit 25.

When recording video data and audio data on the recording medium 26, the recording/playback processing circuit 25 performs a process of encoding the video data supplied from the video signal processing circuit 24 and the audio data supplied from the audio signal processing circuit 32 into a format suitable for being recorded on the recording medium 26 (e.g., MPEG format), supplies the video and audio data to the recording medium 26, and records the data thereon. The recording medium 26 is constituted by a magnetic tape, a DVD (Digital Versatile Disc), or the like, and is loaded into the camcorder 2 as necessary. Alternatively, a recording device such as a hard disk may be used as the recording medium 26.

When allowing the video data recorded on the recording medium 26 to be displayed on the LCD 30, the recording/playback processing circuit 25 decodes the video data read from the recording medium 26 in accordance with the MPEG method so as to convert the video data to analog video signals, and supplies the analog video signals to the superimposing circuit 29.

Also, when allowing the video data recorded on the recording medium 26 to be displayed on the display of the TV 1 via the HDMI output terminal 13, the recording/playback processing circuit 25 decodes the video data read from the recording medium 26 and outputs the video data as uncompressed digital video data to the HDMI transmitting unit 34.

The superimposing circuit 29 superimposes the video data supplied from the recording/playback processing circuit 25 and image data to display various GUIs (Graphical User Interfaces), such as icons, on the LCD 30 supplied from the OSD circuit 28, and outputs the video data obtained through the superimposing to the LCD 30 or the HDMI transmitting unit 34, so as to display the video data on the LCD 30 or the display of the TV 1.

When the recording/playback processing circuit 25 plays back audio data recorded on the recording medium 26 from the speaker 33, the recording/playback processing circuit 25 decodes the audio data read from the recording medium 26, converts the audio data to analog audio signals, performs a process of adjusting volume, and outputs the audio signals to the speaker 33.

Furthermore, when the recording/playback processing circuit 25 plays back audio data recorded on the recording medium 26 in the TV 1 via the HDMI output terminal 13, the recording/playback processing circuit 25 decodes the audio data read from the recording medium 26 and outputs the audio data as uncompressed digital audio data to the HDMI transmitting unit 34.

The operation input unit 27 inputs an operation by a user and supplies a signal corresponding to the operation to the CPU 21. The operation input unit 27 includes a button, a key, and a lever, and the like. The CPU 21 executes various processes on the basis of signals input from the operation input unit 27.

The LCD 30 displays video data supplied from the superimposing circuit 29. The speaker 33 outputs audio data supplied from the recording/playback processing circuit 25.

The flash memory 40 is a nonvolatile memory storing various types of software of an OS (Operating System) or an application and various data including logical and physical addresses of the camcorder 2 assigned by the TV 1, for example.

The HDMI transmitting unit 34 is connected to the TV 1 through the HDMI cable 5 via the HDMI output terminal 13, and receives/outputs video signals, audio signals, and other various types of signals as uncompressed digital data from/to the TV 1.

Although not illustrated, the above-described DVD player 3 includes an HDMI transmitting unit that is the same as the HDMI transmitting unit 34 of the camcorder 2. The TV 1 includes an HDMI receiving unit compatible with those HDMI transmitting units.

Figure 3:
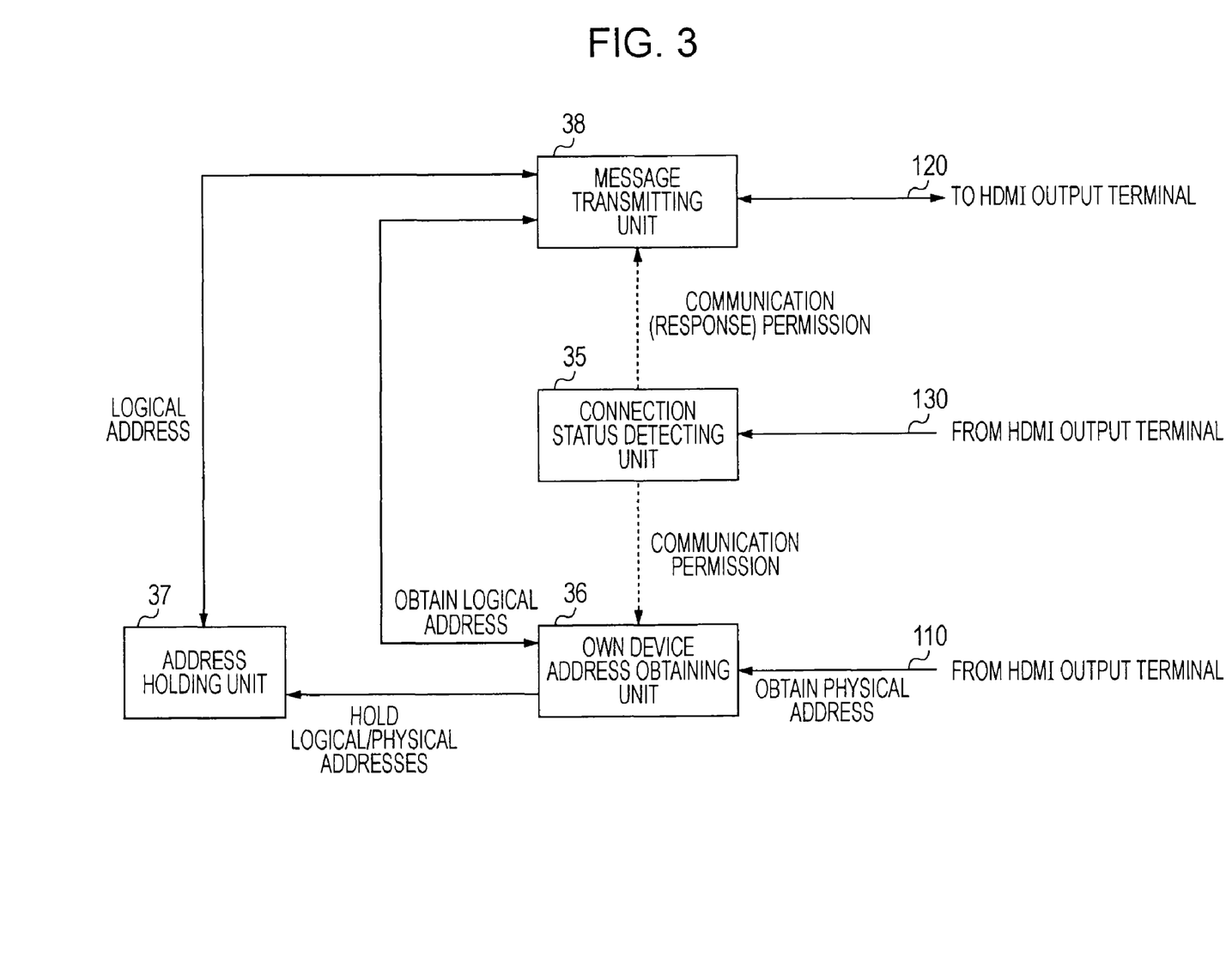
FIG. 3 is a diagram illustrating a functional block configuration of the camcorder according to an embodiment of the present invention.

FIG. 3 is a diagram illustrating a functional block configuration of the camcorder 2. As illustrated in FIG. 3, the camcorder 2 includes a connection status detecting unit 35, an own device address obtaining unit 36, an address holding unit 37, and a message transmitting unit 38.

The connection status detecting unit 35 detects High/Low of an HPD signal (DC bias level) output from the TV 1 as a sink device through an HPD line 130. When HPD=H, the connection status detecting unit 35 determines that read of EDID (E-EDID: Enhanced Extended Display Identification Data) through a DDC line 110 (described below) and unidirectional transmission of uncompressed digital data to the sink device are permitted by the sink device. When HPD=L, the connection status detecting unit 35 determines that the read and unidirectional transmission are not permitted. Also, the connection status detecting unit 35 permits message response to the TV 1 by the message transmitting unit 38 in accordance with H/L of the HPD signal.

When the connection status detecting unit 35 determines that the unidirectional transmission is permitted, the own device address obtaining unit 36 reads the EDID of the TV 1 through the DDC line 110 and obtains a physical address of the camcorder 2. Also, the own device address obtaining unit 36 obtains a logical address of the camcorder 2 from the TV 1 via the message transmitting unit 38. Details of an operation of obtaining the physical and logical addresses are described below.

The address holding unit 37 holds the logical and physical addresses obtained by the own device address obtaining unit 36 in the flash memory 40.

The message transmitting unit 38 performs transmission/reception of a CEC message to/from the TV 1 through a CEC line 120 by using the logical and physical addresses held by the address holding unit 37. Also, as described above, the message transmitting unit 38 changes a method for responding to a received message in accordance with H/L of the HPD signal detected by the connection status detecting unit 35. Details of the operation of responding to a message are described below.

The above-described respective units 35 to 38 can be realized as a program or the like. The flash memory 40 stores the program to execute the respective units 35 to 38.

Figure 4:
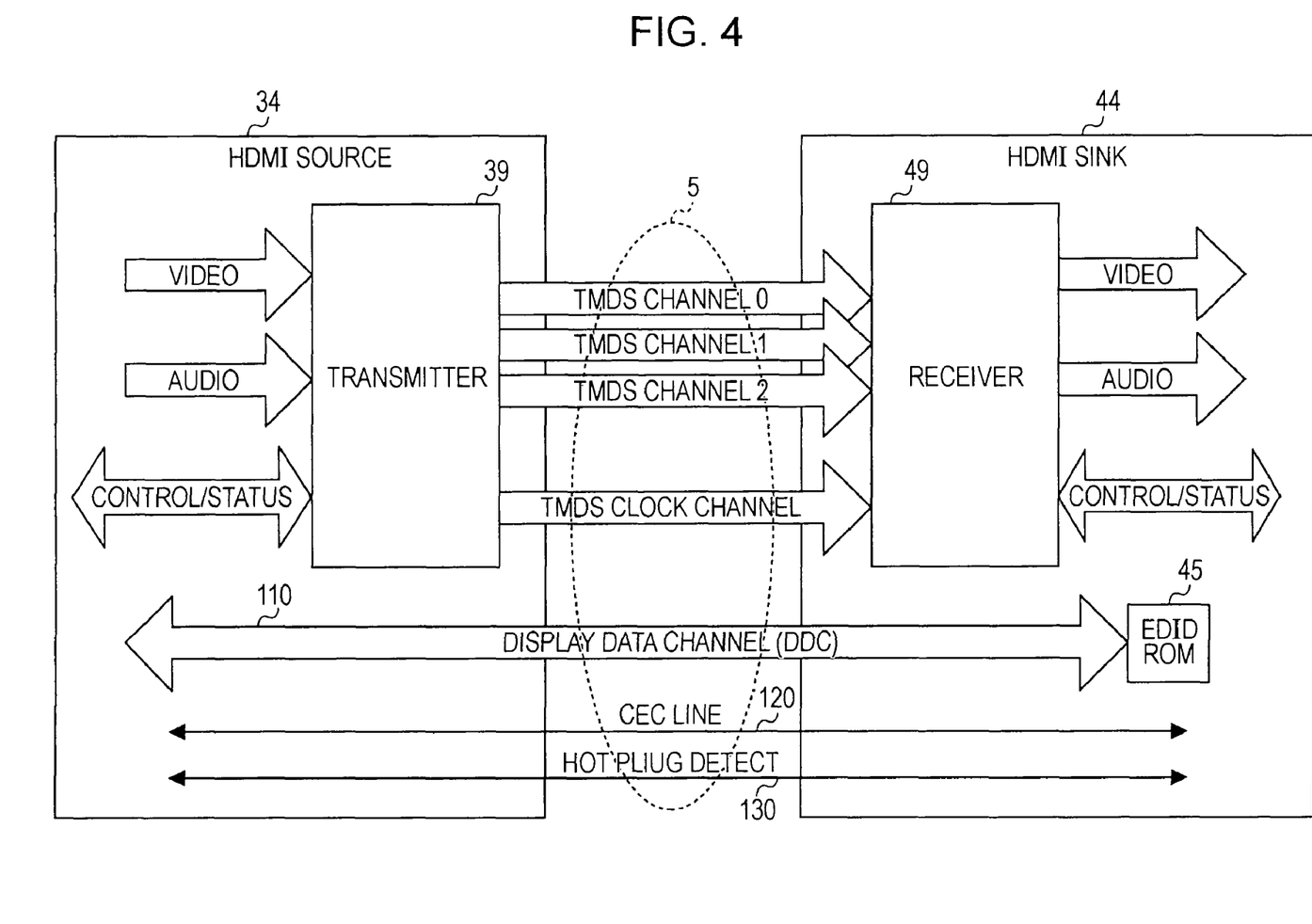
FIG. 4 is a diagram illustrating a configuration of an HDMI transmitting unit of the camcorder and an HDMI receiving unit of a TV according to an embodiment of the present invention.

FIG. 4 is a diagram illustrating a configuration of the HDMI transmitting unit 34 of the camcorder 2 and an HDMI receiving unit 44 of the TV 1. As described above, the HDMI transmitting unit 34 of the camcorder 2 serves as an HDMI source side, whereas the HDMI receiving unit 44 of the TV 1 serves as an HDMI sink side. Note that the functions of the source and sink may be inversed between the TV 1 and the camcorder 2. Also, as described above, the HDMI transmitting unit 34 and the HDMI receiving unit 44 are connected through the HDMI cable 5. Alternatively, the both may be connected to each other wirelessly.

The HDMI transmitting unit 34 includes a transmitter 39. The transmitter 39 converts uncompressed pixel data of images constituting video to corresponding differential signals and serially transmits the differential signals unidirectionally to the HDMI receiving unit 44 through three TMDS channels #0, #1, and #2.

Also, the transmitter 39 converts audio data accompanying uncompressed video, necessary control data, and other auxiliary data to corresponding differential signals and serially transmits the differential signals unidirectionally to the HDMI receiving unit 44 through the three TMDS channels #0, #1, and #2.

Furthermore, the transmitter 39 transmits pixel clocks synchronizing with the pixel data transmitted through the three TMDS channels #0, #1, and #2 to the HDMI receiving unit 44 through a TMDS clock channel. Here, in each TMDS channel #i (i=0, 1, or 2), 10-bit pixel data is transmitted in one pixel clock.

The HDMI receiving unit 44 includes a receiver 49. The receiver 49 receives the differential signals corresponding to the pixel data and the differential signals corresponding to the audio data and control data that are unidirectionally transmitted from the HDMI transmitting unit 34 through the TMDS channels #0, #1, and #2 in synchronization with the pixel clocks transmitted from the HDMI transmitting unit 34 through the TMDS clock channel.

As transmission channels between the HDMI transmitting unit 34 and the HDMI receiving unit 44, there are provided three transmission channels including the DDC line 110, CEC line 120, and HPD line 130 also illustrated in FIG. 3, in addition to the TMDS channels #0 to #2 and the TMDS clock channel.

The DDC line 110 is composed of two signal lines (not illustrated) included in the HDMI cable 5 and is used by the HDMI transmitting unit 34 to read the above-described EDID from the HDMI receiving unit 44.

That is, the HDMI receiving unit 44 includes an EDIDROM (EDID ROM (Read Only Memory)) 45 storing the EDID, which is information about own setting and performance, in addition to the receiver 49. The HDMI transmitting unit 34 reads, from the HDMI receiving unit 44, the EDID stored in the EDIDROM 45 of the HDMI receiving unit 44 through the DDC line 110. On the basis of the EDID, the HDMI transmitting unit 34 recognizes the setting and performance of the HDMI receiving unit 44, that is, an image format (profile) compatible with the HDMI receiving unit 44 (electronic device including the HDMI receiving unit 44), e.g., RGB (Red/Green/Blue), YCbCr 4:4:4, or YCbCr 4:2:2.

Also, the physical address assigned to the HDMI transmitting unit 34 is described in the EDID. The HDMI transmitting unit 34 obtains the own physical address by allowing the own device address obtaining unit 36 to read the EDID.

The CEC line 120 is composed of one signal line (not illustrated) included in the HDMI cable 5 and is used for bidirectional communication of controlling data or a message (CEC message) between the HDMI transmitting unit 34 and the HDMI receiving unit 44.

As described above, the HPD line 130 is used by the HDMI transmitting unit 34 and the HDMI receiving unit 44 to detect the connection with the other electronic device, that is, the HDMI receiving unit 44 or the HDMI transmitting unit 34, and to determine whether unidirectional transmission or a response to a message is permitted.

Hereinafter, an operation of the HDMI transmission system having the above-described configuration is described.

First, a description is given about an operation of the system in the case where the camcorder 2 is connected to the HDMI input terminal 11 of the TV 1 while the DVD player 3 is connected to the HDMI input terminal 12 and where the connection of the camcorder 2 and the DVD player 3 is not changed between the HDMI input terminals 11 and 12 thereafter.

Figure 5A:
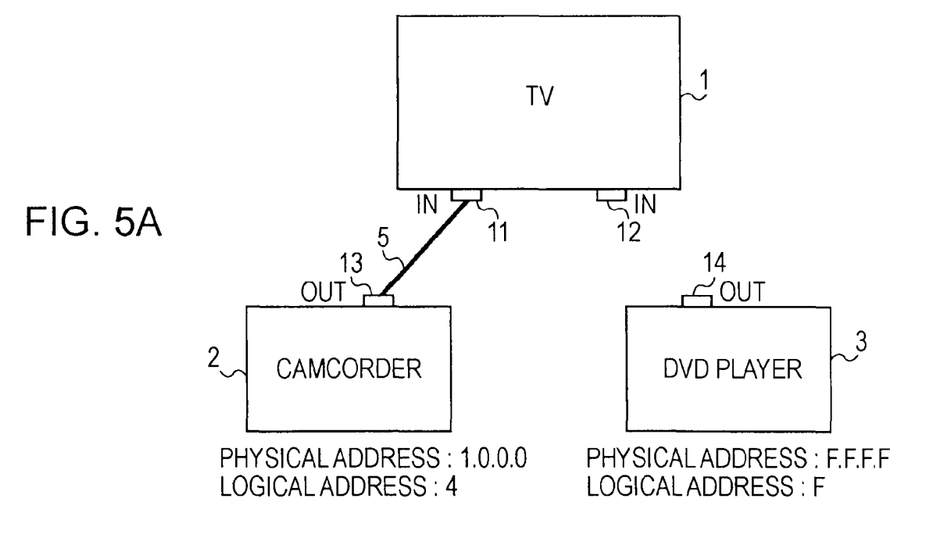
FIGS. 5A and 5B are diagrams illustrating a state where the camcorder and a DVD player are connected to the TV and physical and logical addresses are assigned in an embodiment of the present invention.
Figure 5B:
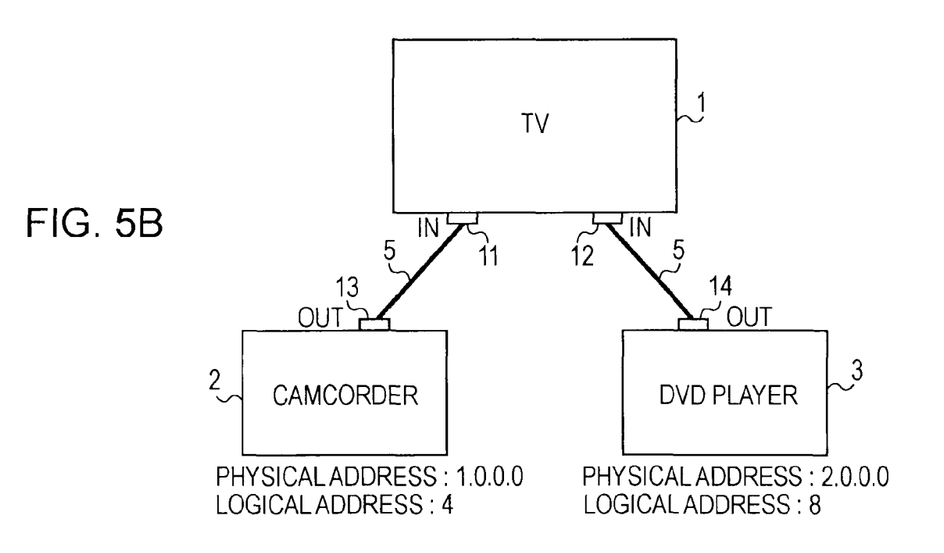
Figure 6:
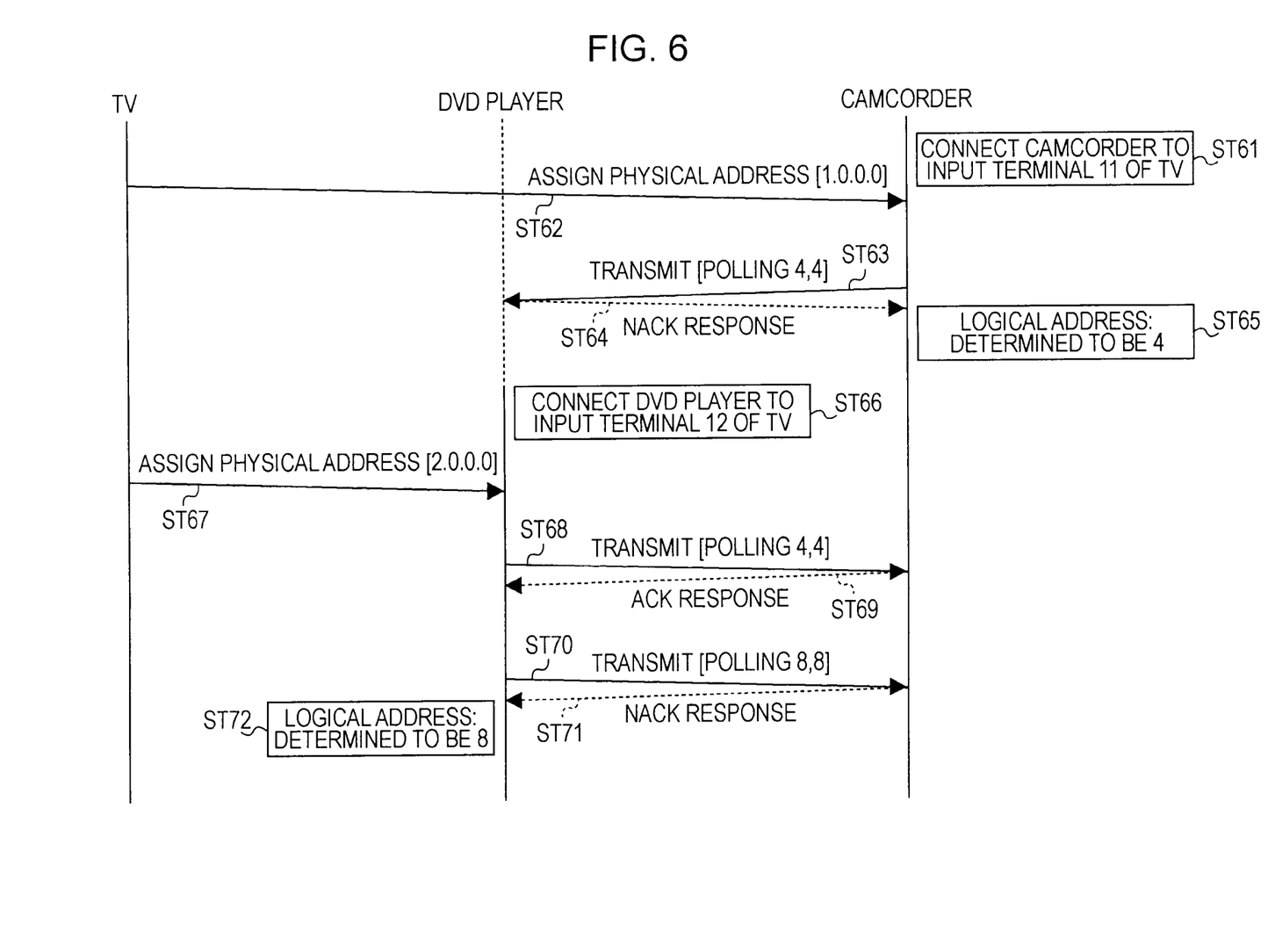
FIG. 6 is a sequence diagram illustrating a flow of information when physical and logical addresses are assigned to the camcorder and the DVD player in an embodiment of the present invention.

FIGS. 5A and 5B are diagrams illustrating a state where the camcorder 2 is connected to the TV 1, the DVD player 3 is connected to the TV 1, and then physical and logical addresses are assigned. FIG. 6 is a sequence diagram illustrating a flow of information when the physical and logical addresses are assigned to the camcorder 2 and the DVD player 3.

As illustrated in FIG. 5A, the camcorder 2 is connected to the HDMI input terminal 11 among the two HDMI input terminals 11 and 12 of the TV 1 through the HDMI cable 5, and then the screen input of the TV 1 is set to the HDMI input terminal 11 (step 61 in FIG. 6). Accordingly, the TV 1, which has no HDMI output terminal, becomes a root device having a physical address [0.0.0.0]. The TV 1 sets [1.0.0.0], which is a physical address of the device connected to the input terminal 11, to the EDID of the HDMI input terminal 11 in accordance with a physical address assigning rule of the HDMI and permits read of the EDID by the HPD (HPD=H).

In the camcorder 2 of which HDMI output terminal 13 is connected to the HDMI input terminal 11 of the TV 1, the connection status detecting unit 35 detects permission to read the EDID by the HPD of the TV 1 (HPD=H) and gives communication permission to the own device address obtaining unit 36. The own device address obtaining unit 36 that has received the communication permission reads the EDID from the EDIDROM 45 of the TV 1 through the DDC line 110 and obtains the physical address [1.0.0.0] described in the EDID (step 62 in FIG. 6).

Then, in the camcorder 2 that has been assigned with the physical address, the own device address obtaining unit 36 performs a process of obtaining a logical address. The logical address is an ID defining a category of the device, and the definition of the logical address is specified by the CEC protocol.

Figure 7:
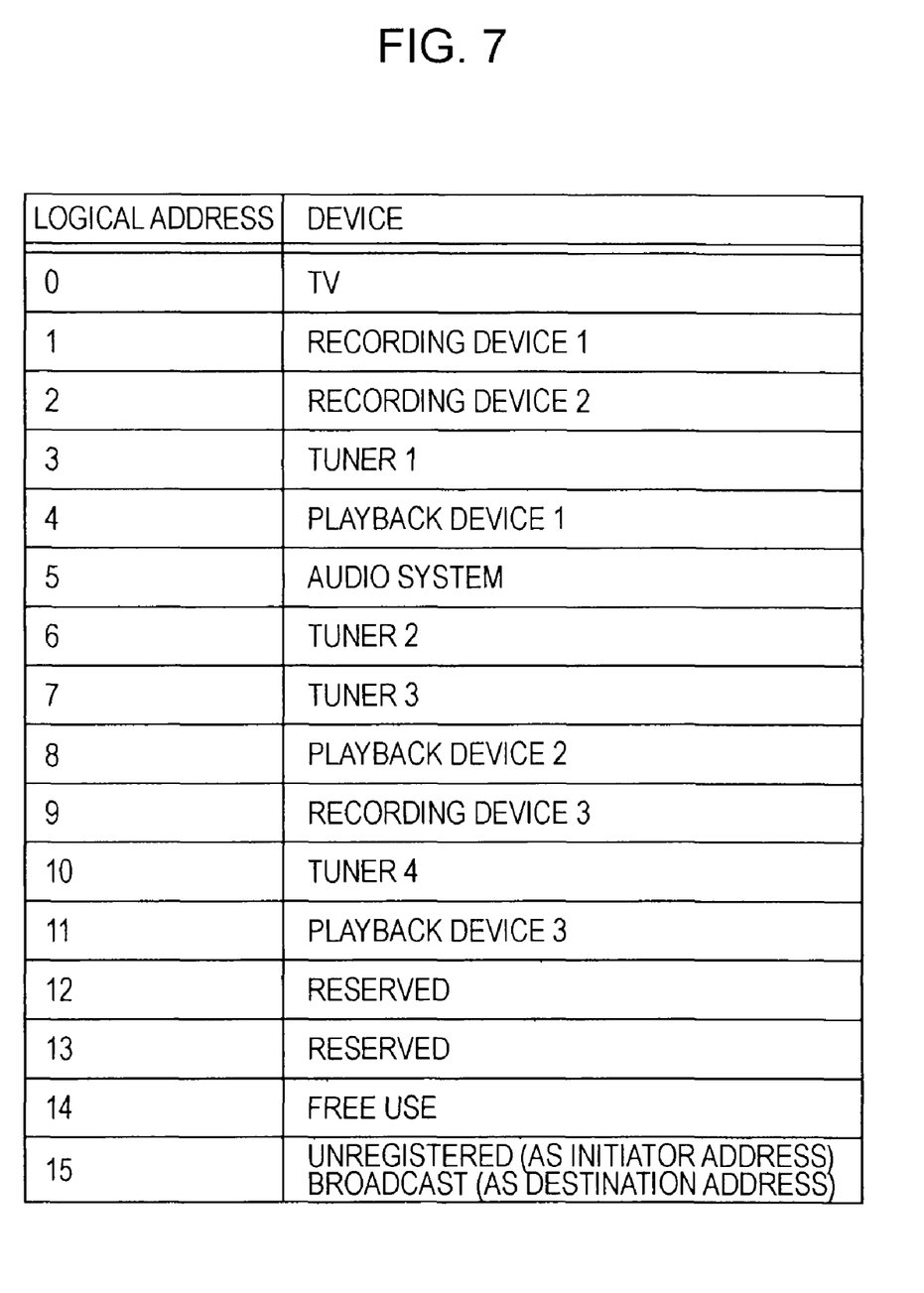
FIG. 7 is a table illustrating definition of logical addresses specified by a CEC protocol used in an embodiment of the present invention.

FIG. 7 is a table illustrating definition of logical addresses specified by the CEC protocol. As illustrated in FIG. 7, the camcorder 2 is categorized as [Playback Device], and thus the camcorder 2 tries to obtain a logical address of any of [4], [8], and [11].

The logical address is obtained when the own device address obtaining unit 36 allows the message transmitting unit 38 to issue a [Polling] message, which one of CEC messages. Now, the CEC message is described.

Figure 8:
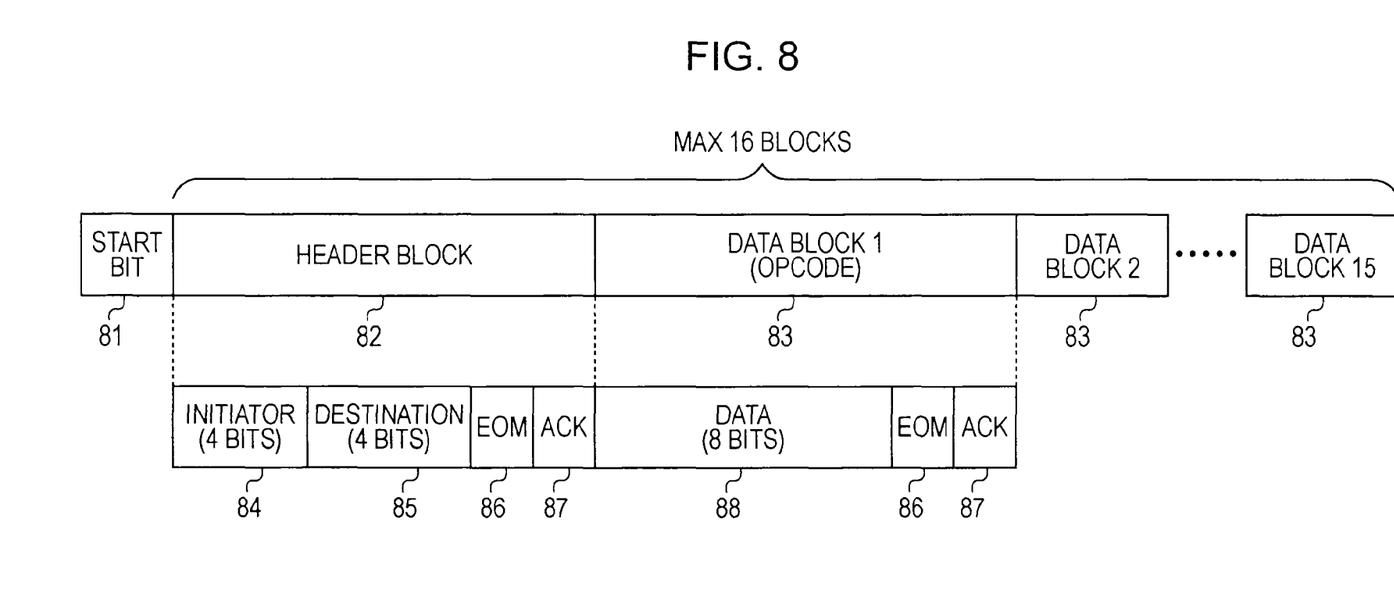
FIG. 8 is a diagram illustrating a frame structure of a CEC message used in an embodiment of the present invention.

FIG. 8 is a diagram illustrating a frame structure of the CEC message. As illustrated in FIG. 8, the CEC message is composed of a start bit 81 and one or more blocks. The first block of the CEC message serves as a header block 82, and the subsequent blocks serve as data blocks 83.

The header block 82 is composed of a 4-bit initiator field 84, a 4-bit destination field 85, a 1-bit EOM (End Of Message) field 86, and a 1-bit ACK (Acknowledge) field 87.

In the initiator field 84, a logical address of a message transmitting device is set by the message transmitting device. In the destination field 85, a logical address of a message destination device is set by the message transmitting device. In the EOM field 86, whether a further block to be transmitted exists is set by the message transmitting device. If "0" is set in the EOM field 86, which indicates there is a further block. If "1" is set therein, which indicates there is no further block. In the ACK field 87, whether the message destination device matches the destination of the message or whether the message is refused is set as a response to the message by the message destination device. In the case where a destination logical address has a value other than [15] (=Broadcast), if "1" is set in the ACK field 87, which indicates mismatch or refusal, whereas if "0" is set in the ACK field 87, which indicates match or acceptance. In the case where the destination logical address has a value [15] (=Broadcast), if "0" is set in the ACK field 87, which indicates mismatch or refusal, whereas if "1" is set in the ACK field 87, which indicates match or acceptance.

When the camcorder 2 obtains a logical address by transmitting a [Polling] message, the logical address of the device has not been determined. Thus, the value of the logical address desired to be obtained by the camcorder 2 ([4] in the case of FIG. 6) is set in the above-described initiator field 84 and the destination field 85. At this time, "1" is set in each of the EOM field 86 and the ACK field 87 (step 63 in FIG. 6).

If a response in which "0" is set in the ACK field 87 is returned in response to the [Polling] message, which means there exists a device having the logical address set in the initiator field 84 and the destination field 85. Thus, the camcorder 2 transmits the [Polling] message by changing the logical address to another (e.g., [8] or [11]) until receiving a NACK response to the [Polling] message, so as to obtain the logical address.

In the case of FIG. 6, a NACK response is obtained from the DVD player 3 in response to the [Polling 4,4] message transmitted in step 63, so that the logical address of the camcorder 2 is determined to be [4] (step 65).

The physical and logical addresses of the camcorder 2 obtained in the above-described process are held by the address holding unit 37.

Then, as illustrated in FIG. 5B, the DVD player 3 is connected to the HDMI input terminal 12 of the TV 1 through the HDMI cable 5 (step 66 in FIG. 6).

The TV 1 sets [2.0.0.0], which is a physical address of the device connected to the input terminal 12, to the EDID of the HDMI input terminal 12 in accordance with the physical address assigning rule of the HDMI and permits read of the EDID by the HPD.

As the camcorder 2, the DVD player 3 of which HDMI output terminal 14 is connected to the HDMI input terminal 12 of the TV 1 detects permission to read the EDID by the HPD of the TV 1 (HPD=H), reads the EDID from the EDIDROM 45 of the TV 1 through the HPD line, and obtains the physical address [2.0.0.0] described in the EDID (step 67 in FIG. 6).

Then, the DVD player 3 that has been assigned with the physical address obtains a logical address [8] by transmitting [Polling] messages until receiving a NACK response from the camcorder 2 in the same method as the above-described method used in the camcorder 2 (steps 68 to 72).

In this way, after the respective devices have obtained the physical and logical addresses, the respective devices issue a report notification indicating the correspondence between the physical address and the logical address through the CEC line 120. This report notification is executed through transmission of a [Report Physical Address] message, which is one of the CEC messages. By using the physical and logical addresses, the TV 1 can receive uncompressed digital data from each of the camcorder 2 and the DVD player 3 through the HDMI cables 5 and display the digital data.

Next, a description is given about an operation of the HDMI transmission system in the case where the connection of the camcorder 2 and the DVD player 3 is changed between the HDMI input terminals 11 and 12 of the TV 1. Here, as an example, a description is given about the following case: after the camcorder 2 is connected to the HDMI input terminal 11 of the TV 1, the camcorder 2 is once disconnected from the HDMI input terminal 11, the DVD player 3 is connected to the HDMI input terminal 11, and then the camcorder 2 is connected to the HDMI input terminal 12.

Figure 9:
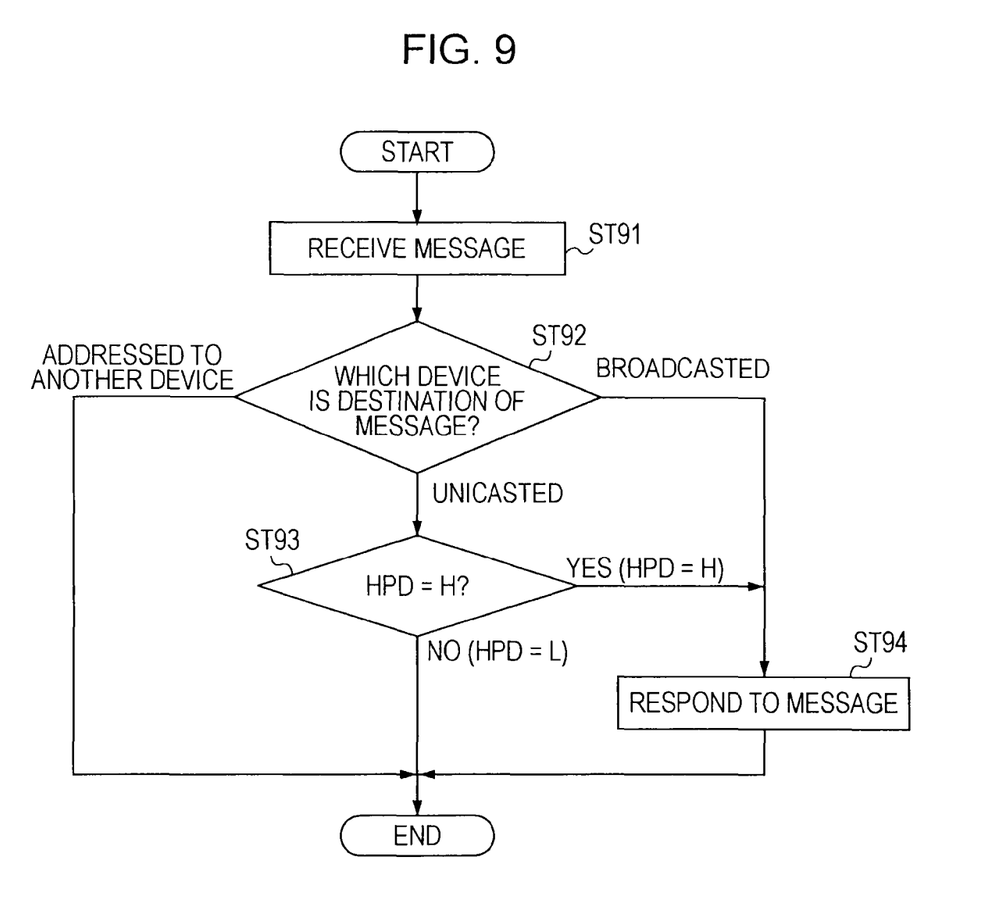
FIG. 9 is a flowchart illustrating a flow of a responding process performed by the camcorder in response to a CEC message transmitted to the camcorder according to an embodiment of the present invention.

FIG. 9 is a flowchart illustrating a flow of a responding process performed by the camcorder 2 in response to a CEC message transmitted to the camcorder 2 in the case where the camcorder 2 is connected to the TV 1 in the above-described manner.

As illustrated in FIG. 9, in the camcorder 2, the message transmitting unit 38 receives a CEC message through the CEC line 120 (step 91). The CPU 21 of the camcorder 2 refers to the destination field 85 of the header block 82 of the received CEC message so as to determine which device is the destination of the CEC message (step 92).

In this case, the CPU 21 determines whether the destination of the CEC message includes the camcorder 2. If the destination includes the camcorder 2, the CPU 21 determines whether the CEC message is unicasted or broadcasted.

If the CEC message is broadcasted, the CPU 21 allows the message transmitting unit 38 to respond to the message (step 94). An example of the broadcasted CEC message is a [Standby] message to instruct each device to turn OFF the device.

If the CEC message is unicasted, the CPU 21 allows the connection status detecting unit 35 to determine whether the status of the HPD is "High" or "Low" (step 93).

When HPD=H, the CPU 21 allows the message transmitting unit 38 to respond to the CEC message. For example, when a [Play] message to provide instructions to play back content such as video data is received and when HPD=H, the CPU 21 plays back the content. On the other hand, when HPD=L, the CPU 21 ends the process without responding to the CEC message even if the CEC message is addressed to the own device.

Also, if the received CEC message is addressed to another electronic device in step 92, the CPU 21 ends the process without responding.

The above-described process by the camcorder 2 is specifically described in a flow of a series of processes including connection to the TV 1, acquisition of physical and logical addresses, and response to a message.

Figure 10A:
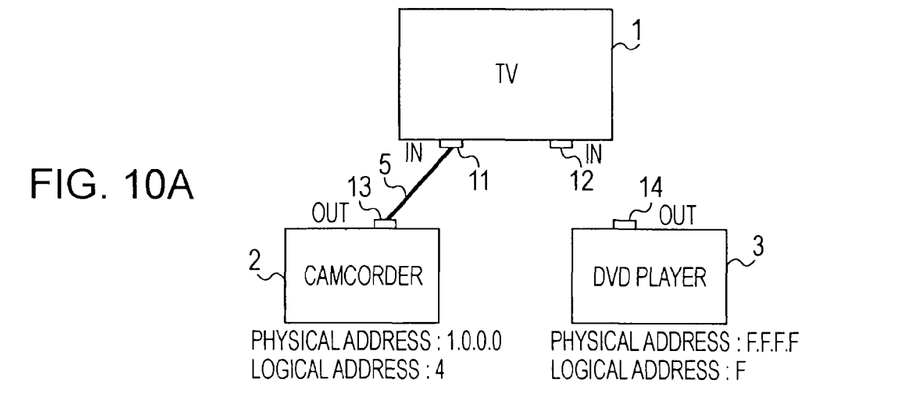
FIGS. 10A to 10C are diagrams illustrating a state where physical and logical addresses are assigned when connection of the camcorder and the DVD player is changed between two HDMI input terminals of the TV in an embodiment of the present invention.
Figure 10B:
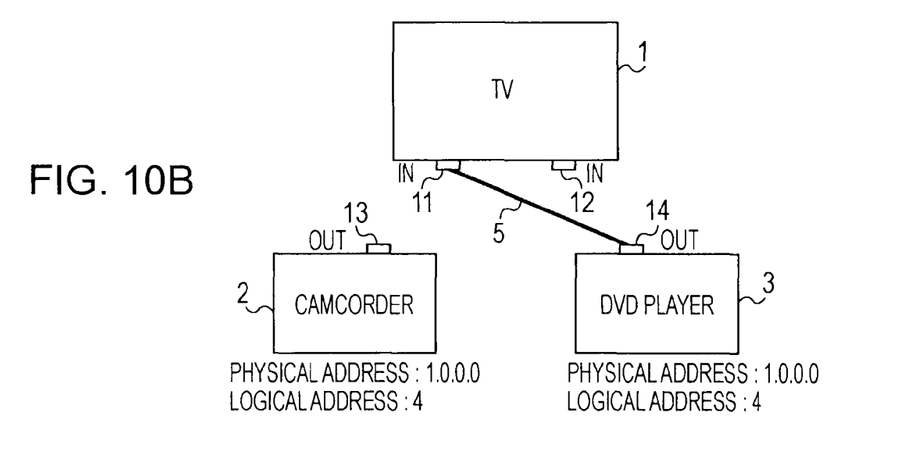
Figure 10C:
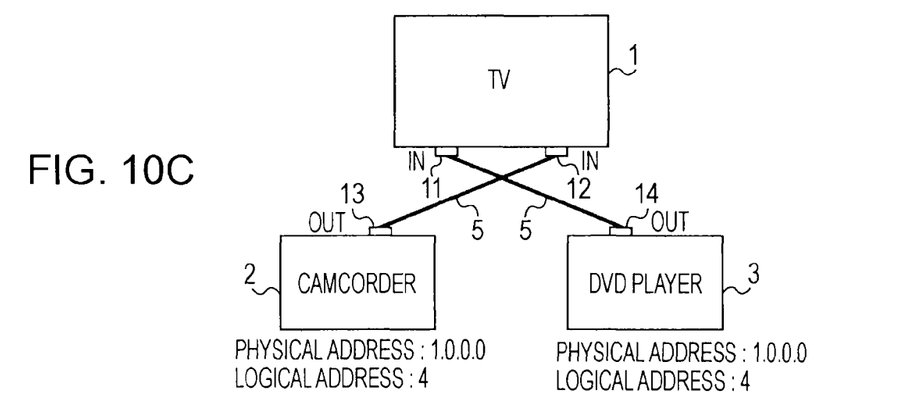
Figure 11:
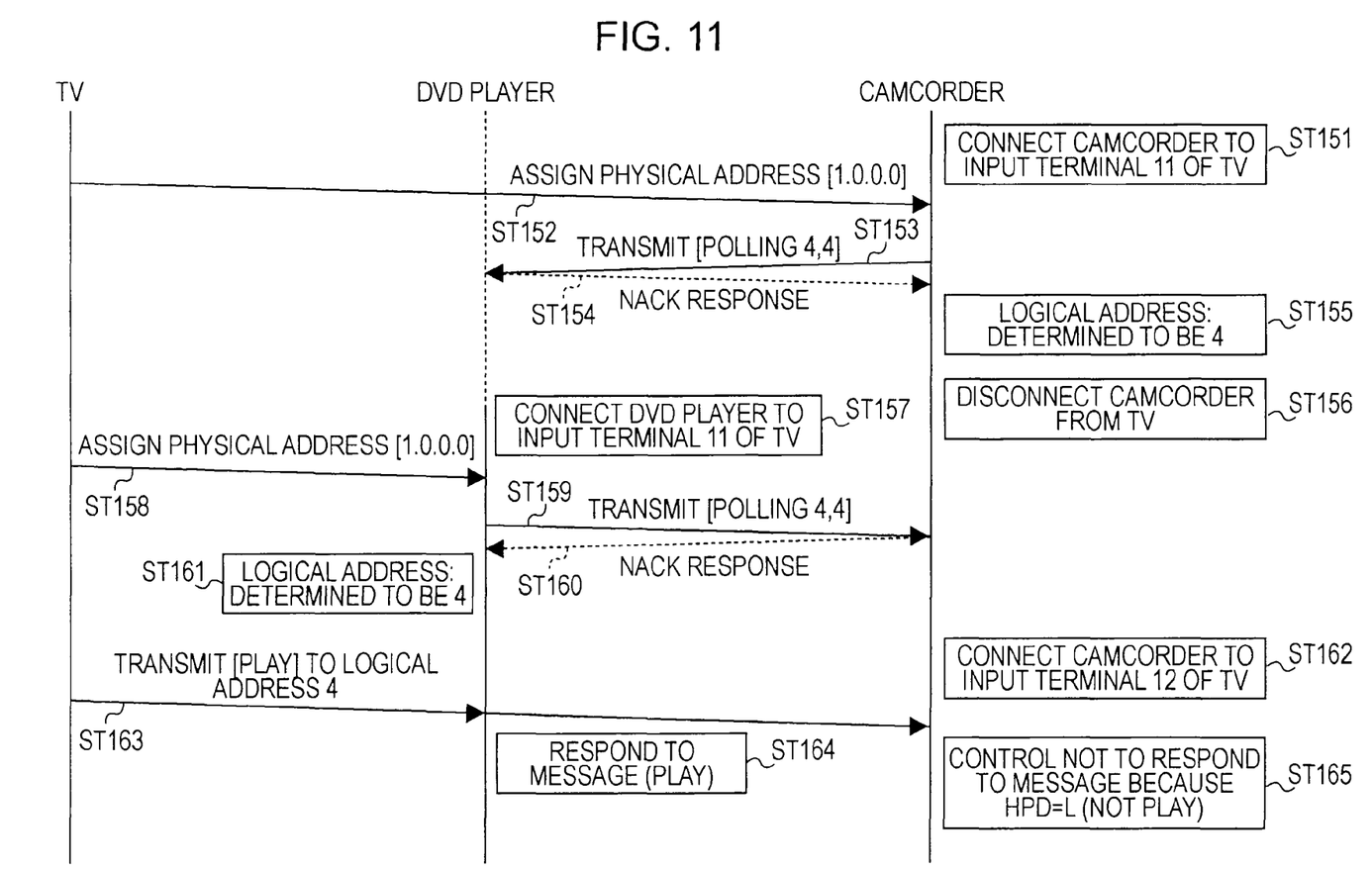
FIG. 11 is a sequence diagram illustrating a flow of information when physical and logical addresses are assigned to the camcorder and the DVD player when connection of the camcorder and the DVD player is changed between the two HDMI input terminals of the TV in an embodiment of the present invention.

FIGS. 10A to 10C are diagrams illustrating a state where physical and logical addresses are assigned in the case where the connection of the camcorder 2 and the DVD player 3 is changed between the two HDMI input terminals 11 and 12 of the TV 1. FIG. 11 is a sequence diagram illustrating a flow of information when physical and logical addresses are assigned to the camcorder 2 and the DVD player 3 and responding to a message is performed.

As illustrated in FIG. 10A, the camcorder 2 is connected to the HDMI input terminal 11 among the two HDMI input terminals 11 and 12 of the TV 1 through the HDMI cable 5, and the screen input of the TV 1 is set to the HDMI input terminal 11 (step 151 in FIG. 11). As in the case illustrated in FIG. 6, the TV 1 sets [1.0.0.0], which is a physical address of the device connected to the input terminal 11, to the EDID of the HDMI input terminal 11 and permits read of the EDID by the HPD (HPD=H).

In the camcorder 2 of which HDMI output terminal 13 is connected to the HDMI input terminal 11 of the TV 1, the connection status detecting unit 35 detects permission to read the EDID by the HPD of the TV 1 (HPD=H) and gives communication permission to the own device address obtaining unit 36. The own device address obtaining unit 36 that has received the communication permission reads the EDID from the EDIDROM 45 of the TV 1 through the DDC line 110 and obtains the physical address [1.0.0.0] described in the EDID (step 152 in FIG. 11).

Then, as in the case illustrated in FIG. 6, the own device address obtaining unit 36 of the camcorder 2 that has been assigned with the physical address obtains a logical address [4] by allowing the message transmitting unit 38 to issue a [Polling] message (steps 153 to 155). In the camcorder 2, the address holding unit 37 holds the obtained physical and logical addresses.

Then, as illustrated in FIG. 10B, the camcorder 2 is disconnected from the HDMI input terminal 11 of the TV 1 (step 156 in FIG. 11) and the DVD player 3 is connected to the HDMI input terminal 11 (step 157 in FIG. 11). Accordingly, the HPD of the camcorder 2 shifts to "Low".

The TV 1 sets [1.0.0.0], which is a physical address of the device connected to the HDMI input terminal 11, to the EDID of the HDMI input terminal 12, and permits read of the EDID by the HPD.

As the camcorder 2, the DVD player 3 of which HDMI output terminal 14 is connected to the HDMI input terminal 11 of the TV 1 detects permission to read the EDID by the HPD of the TV 1 (HPD=H), reads the EDID from the EDIDROM 45 of the TV 1 through the HPD line, and obtains the physical address [1.0.0.0] described in the EDID (step 158 in FIG. 11).

Then, the DVD player 3 that has been assigned with the physical address transmits a [Polling] message in order to obtain a logical address (step 159 in FIG. 11). At this time, the camcorder 2 is not connected to the TV 1, and thus a NACK response is transmitted in response to the [Polling] message to the camcorder 2 (step 160 in FIG. 11). Thus, the logical address of the DVD player 3 is determined to be [4] (step 161 in FIG. 11).

Then, as illustrated in FIG. 10C, the camcorder 2 is connected to the HDMI input terminal 12 of the TV 1 (step 162 in FIG. 11). At this time, the screen input of the TV 1 is set to the HDMI input terminal 11 and the HPD of the HDMI input terminal 12 is kept at "Low". Thus, a process of re-obtaining physical and logical addresses of the camcorder 2 is not performed. Accordingly, the physical and logical addresses of the camcorder 2 are the same as the addresses held by the address holding unit 37, that is, the physical and logical addresses of the DVD player 3.

Then, a CEC message, such as [Play], is issued to the DVD player 3 (to the logical address [4]) from the TV 1 (step 163).

In this case, the DVD player 3 performs a content playback process in response to the CEC message (step 164). On the other hand, the CPU 21 of the camcorder 2 allows the connection status detecting unit 35 to detect that HPD=L although the CEC message is a CEC message addressed to the own device as illustrated in FIG. 9 and controls the message transmitting unit 38 not to respond to the CEC message (step 165).

If the camcorder 2 has received the CEC message that is broadcasted, the camcorder 2 responds to the CEC message as illustrated in FIG. 9. Then, when the screen input of the TV 1 is set to the HDMI input terminal 12 and when HPD=H, the camcorder 2 performs a process of re-obtaining physical and logical addresses to newly obtain a logical address [8]. If the camcorder 2 receives a CEC message addressed to the logical address [8] in this state, the camcorder 2 responds to the CEC message because HPD=H.

With the above-described process, even if the camcorder 2 receives a CEC message addressed to the own device, if the HPD=L, control can be performed not to respond to the CEC message. Thus, even if there exists another electronic device having the same physical and logical addresses under conditions including the order of connection to the TV 1, a wrong response to a CEC message addressed to the other electronic device can be prevented.

The present invention is not limited to the above-described embodiment. Of course, various modifications can be added without deviating from the scope of the present invention.

In the above-described embodiment, a description has been given about the case where the TV 1 includes two HDMI input terminals. Of course, the TV 1 may include three or more HDMI input terminals. In that case, if an electronic device is connected to the HDMI input terminal to which the camcorder 2 has once been connected and if the camcorder 2 is connected to another HDMI input terminal, responding to a message can be controlled by the process illustrated in FIG. 9.

In the above-described embodiment, a camcorder is adopted as an electronic device to control responding to a message in accordance with H/L of the HPD signal. However, the electronic device may be another mobile device, such as a digital still camera, a notebook PC (Personal Computer), or a portable DVD player, or a stationary device.

In the above-described embodiment, a wired network system in which respective devices are connected through the HDMI cables 5 is shown. However, the present invention can be applied to a network system in which the respective devices are connected through a wireless HDMI.

In the above-described embodiment, the HDMI is adopted as an interface including a first transmission path capable of unidirectional transmission of uncompressed digital video signals and digital audio signals and a second transmission path capable of bidirectional transmission of predetermined messages. However, the present invention can be applied to any interface other than the HDMI if the interface has such two transmission paths.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic device comprising:
   a connection terminal to make a connection to an external device via an interface including a first transmission path capable of unidirectional transmission of uncompressed digital video signals and digital audio signals and a second transmission path capable of bidirectional transmission of a predetermined message;
   detecting means for detecting whether the unidirectional transmission to the external device through the first transmission path is possible or impossible, and for detecting whether the received message is a unicasted message or a broadcasted message;
   obtaining means for obtaining an address of the electronic device from the external device through the second transmission path if the unidirectional transmission is detected to be possible;
   storage means for storing the obtained address;
   receiving means for receiving the predetermined message from the external device through the second transmission path;
   determining means for determining whether a destination of the received message includes the stored address of the electronic device;
   responding means for responding to the received message if the destination is determined to include the address of the electronic device; and
   control means for controlling the responding means not to respond to the received message if the unidirectional transmission is detected to be impossible, and to respond to the message regardless of whether the unidirectional transmission is possible or impossible if the message is determined to be the broadcasted message.

2. The electronic device according to claim 1, wherein the interface is a high-definition multimedia interface, wherein the first transmission path is a transition minimized differential signaling line, wherein the second transmission path is a consumer electronics control line, and wherein the detecting means detects whether the unidirectional transmission is possible or impossible on the basis of a level of a hot-plug detect signal.

3. A method for responding to a message by an electronic device capable of connecting to an external device via an interface including a first transmission path capable of unidirectional transmission of uncompressed digital video signals and digital audio signals and a second transmission path capable of bidirectional transmission of a predetermined message, the method comprising:
   detecting whether the unidirectional transmission to the external device through the first transmission path is possible or impossible, and whether the received message is a unicasted message or a broadcasted message;
   obtaining an address of the electronic device from the external device through the second transmission path if the unidirectional transmission is detected to be possible;
   storing the obtained address;
   receiving the predetermined message from the external device through the second transmission path;
   determining whether a destination of the received message includes the stored address of the electronic device;
   responding to the received message if the destination is determined to include the address of the electronic device; and
   controlling not to respond to the received message if the unidirectional transmission is detected to be impossible, and to respond to the message regardless of whether the unidirectional transmission is possible or impossible if the message is determined to be the broadcasted message.

4. A non-transitory computer readable medium encoded with a program allowing an electronic device capable of connecting to an external device via an interface including a first transmission path capable of unidirectional transmission of uncompressed digital video signals and digital audio signals and a second transmission path capable of bidirectional transmission of a predetermined message to execute a method comprising:
   detecting whether the unidirectional transmission to the external device through the first transmission path is possible or impossible, and whether the received message is a unicasted message or a broadcasted message;
   obtaining an address of the electronic device from the external device through the second transmission path if the unidirectional transmission is detected to be possible;
   storing the obtained address;
   receiving the predetermined message from the external device through the second transmission path;
   determining whether a destination of the received message includes the stored address of the electronic device;
   responding to the received message if the destination is determined to include the address of the electronic device; and
   controlling not to respond to the received message if the unidirectional transmission is detected to be impossible, and to respond to the message regardless of whether the unidirectional transmission is possible or impossible if the message is determined to be the broadcasted message.

5. An electronic device comprising:
   a connection terminal to make a connection to an external device via an interface including a first transmission path capable of unidirectional transmission of uncompressed digital video signals and digital audio signals and a second transmission path capable of bidirectional transmission of a predetermined message;

a detecting unit configured to detect whether the unidirectional transmission to the external device through the first transmission path is possible or impossible, and to detect whether the received message is a unicasted message or a broadcasted message;

an obtaining unit configured to obtain an address of the electronic device from the external device through the second transmission path if the unidirectional transmission is detected to be possible;

a storage unit configured to store the obtained address;

a receiving unit configured to receive the predetermined message from the external device through the second transmission path;

a determining unit configured to determine whether a destination of the received message includes the stored address of the electronic device;

a responding unit configured to respond to the received message if the destination is determined to include the address of the electronic device; and a control unit configured to control the responding unit to respond to the message regardless of whether the unidirectional transmission is possible or impossible if the message is determined to be the broadcasted message.

* * * * *